Patented Dec. 17, 1940

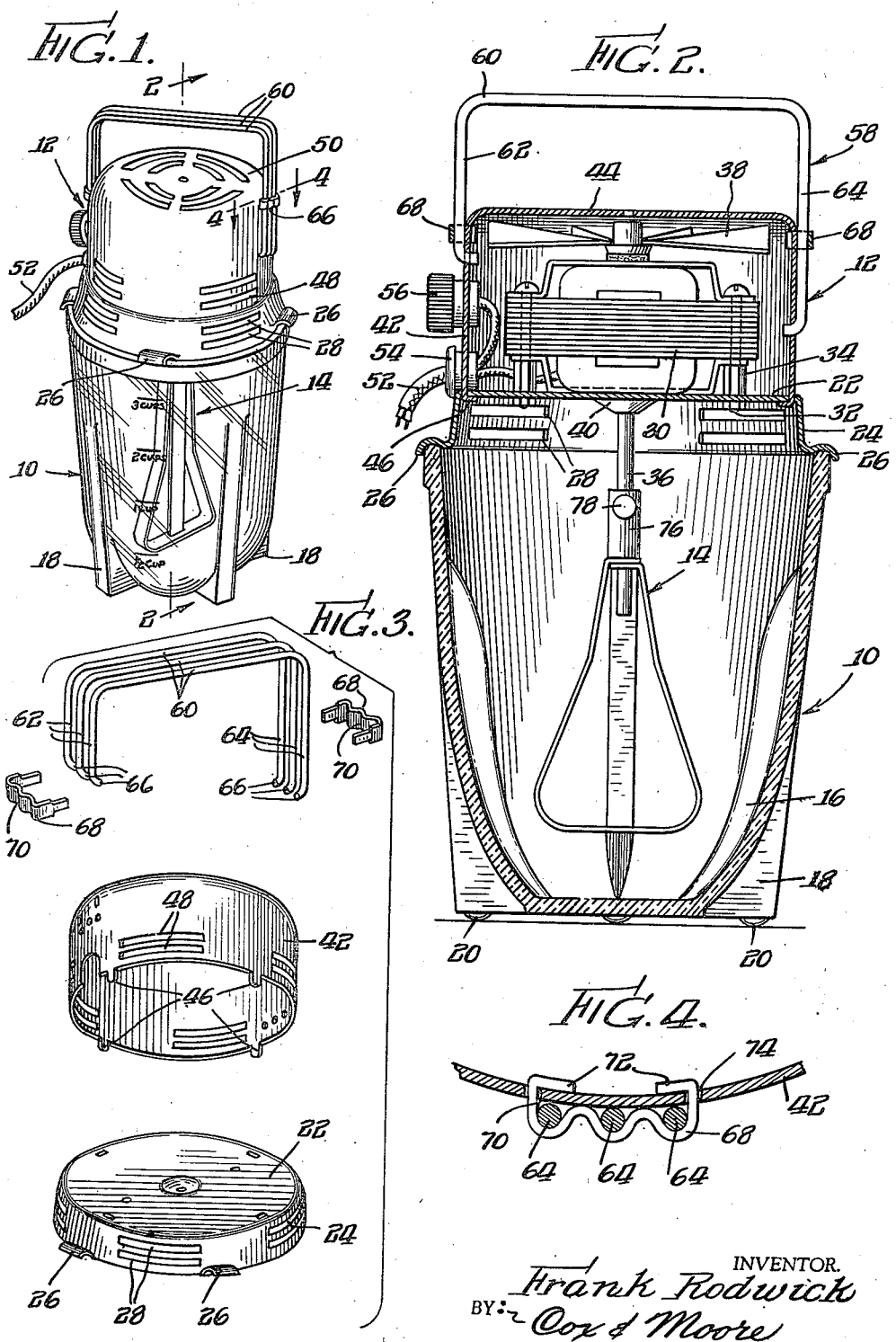

2,225,250

UNITED STATES PATENT OFFICE 2,225,250

HANDLE CONSTRUCTION

Frank Rodwick, Chicago, Ill., assignor to Chicago Electric Manufacturing Company, Chicago, Ill., a corporation of Illinois Original application August 27, 1938, Serial No. 227,124. Divided and this application October 11, 1939, Serial No. 299,001

6 Claims. (Cl. 16—125)

The present invention relates to an electric or other appliance and is more particularly concerned with a mixing or whipping device for use, for example, as a culinary adjunct.

Yet more particularly the present invention contemplates the provision of a motor driven mixer having an improved handle and supporting construction which is extremely simple and inexpensive to manufacture, and provides a serviceable, pleasing structure.

In devices of the present class it is important to provide a suitable handle structure in view of the fact that prolonged operation of the drive motor may cause a relative increase in temperature of the associated parts, and further so that the parts comprising the drive motor may be manipulated during actuation thereof free from interference by any normal vibration and without interfering with the cooling air drafts.

It is, accordingly, an object of the present invention to provide a new and improved handle structure particularly adaptable to appliances of the present class which comprises one or more resilient handle members secured to the housing of the mixer by interengagement therewith to provide a rigid, permanent interconnection.

Another object of the present invention is to provide an improved handle structure as above comprising a plurality of parallel, elongated wires or bars having their ends engaged in apertures in the appliance housing and being rigidly positioned with respect to the housing by a clamping means engaging all of the elongated members and locking them in predetermined relationship with respect to the casing.

Yet more particularly it is an object of the present invention to effect the rigid interconnection of elongated wire or strip members with a housing in the form of a handle construction. In view of the recognition that such members, when engaged at a longitudinal point with the housing, are unsupported against lateral displacement or distortion, it is within the particular contemplation of the present invention to overcome such instability of connection and without the provision of excessive fastening means by arranging the points of interconnection of each handle bale in substantial, axial alignment whereby rotational distortion is resisted.

Numerous other objects and advantages will more fully appear during the course and progress of the following specification.

Figure 1 is a perspective view of a mixing appliance constructed in accordance with the present invention.

Figure 2 is a sectional view taken centrally through the appliance shown in Figure 1 on the line 2—2 therein.

Figure 3 is a perspective view showing the cover and handle construction, the parts being shown in spaced, disassembled relationship to illustrate the details thereof.

Figure 4 is a detail sectional view taken on the line 4—4 in Figure 1.

Referring more particularly to the figures of the drawing, wherein the present invention is shown more in detail, Figures 1 and 2 disclose one preferred illustrative form of mixer embodying the principles of the present invention and comprising a mixing bowl 10 upon which is mounted a cover and driving assembly 12 for actuating a mixer or beater 14. The mixing bowl or container 10 is provided with side walls 20 which taper in a downward direction so that the ultimate configuration thereof may be said to be that of a frustum of a cone.

The bowl, which may comprise glass or any other suitable material, is provided with four upstanding, spaced ribs or ridges 16 molded on the interior surface thereof. The exterior surface of the bowl is so molded or configurated as to provide ridges or buttresses 18. It will be obvious that the lower portions of these ridges provide abutment surfaces in the plane of the lower wall of the bowl for effectively supporting the bowl in upright position at all times. Curved knobs or projections 20 on the lower surface of each of the shoulders or abutments enhance this effect to the extent that the unit will be rigidly and firmly supported in stable relationship on any flat supporting surface.

The cover and driving assembly comprises a base portion or cover proper having a sheet circular top wall 22 terminating peripherally in a downwardly extending wall 24. The downwardly extending wall provides a flange having at its lower edge a plurality of spaced lugs 26.

The lugs or projections space the lower edges of the flange 24 from the upper edge of the bowl 10 to provide free access to the outside atmosphere for facilitating the usual whipping action and the upstanding, annular wall or flange 24 is provided with a plurality of slits 28 to facilitate circulation of air into and through the mixing or whipping zone.

An electric drive motor 30 is mounted on the circular cover wall 22 by a pair of bolts 32 passing through spacing members 34. The motor is provided with a drive shaft 36 having on its upper end a fan blade structure 38 and being extended at its lower end for securement thereto of the beater 14 in a manner to be hereinafter described more in detail.

The upper wall 22 of the cover is centrally deformed downwardly in the form of a cone as at 40, to provide a recess, centrally apertured for the passage of a shaft 36. The recess resides adjacent the lower bearing of the electric motor 30 and may accommodate a suitable fibrous oil retaining washer to retain lubricant and prevent it from traveling downwardly along the shaft 36.

The motor 30 is housed in a cylindrical casing 42 having a horizontal upper wall 44 and being permanently engaged with the cover portion by means of axially extending tabs 46 extending through suitable slits in the cover and turned over, see Figure 2. Slits or apertures 48 and 50 in the lower side and upper walls of the casing 42 permit adequate air draft past the drive motor under the influence of the fan blade or agitator 38. An electric conduit 52 passes through an insulating bushing 54 in the casing 42 for supplying electric energy to the motor 30, control of the motor being effected by a rotatable snap switch 56 mounted just above the bushing 54.

It is desirable that the present device be freely manipulatable by the operator to the end that the cover and drive assembly and the agitator be removable from the bowl, either while the movable parts are being actuated or at rest. To this end there is provided a handle structure comprising three wire members 58 configurated as shown in Figures 1, 2 and 3 in generally U-shaped form with the transversely extending upper portion 60 terminating in downwardly extending sections 62 and 64, respectively.

The several downwardly extending arms or sections 62 and 64 further terminate in inwardly bent sections forming short projections 66 which extend and fit into suitable apertures in the housing 42. It should be noted that the downwardly extending leg portions 62 on the left hand side of the assembly, as shown in the figures, are relatively shorter than the leg 64 on the opposite side whereby adequate space is provided for mounting the control switch 56 therebelow while at the same time assuring adequate rigidity of the handle. This rigidity of interconnection with the casing 42 is maintained by means of clamping or engaging members 68 which engage over the three adjacent leg portions and clamp them in predetermined relationship against the adjacent side of the housing.

More specifically, the clamping members 68 provide a band or strip of sheet material configurated with three recesses 70 adapted to receive the three adjacent leg portions of the handle, as clearly shown in Figure 4, the free ends of the clamping members comprising tabs 72 passing through slits 74 turned over inside the casing for permanent securement thereto. It will be obvious, therefore, that, in accordance with the present improved structure, the plurality of U-shaped handle units 58 are permanently mounted in predetermined, spaced, parallel relationship at all times and are prevented effectively from rotational or arcuate movement about their extremities 66 by reason of the clamping members 68 and by reason of the additional fact that the aforesaid extremities 66 are substantially axially offset or disaligned.

The beater 14 comprises a central sleeve 76 which receives the lower end of the drive shaft 36 and is adjustable for securement at a plurality of positions axially thereof through the agency of an adjustable thumb screw 78. By reason of this structure, the vertical position of the beater within the bowl may be adjusted by the operator.

The present invention provides an improved and simplified mixing structure which may be manufactured and assembled at low cost while being characterized by structural permanency, lightness and ease of manipulation. The present handle structure, moreover, is formed from a plurality of elongated members which may be individually relatively resilient so that the operator's hand comes in contact only with portions which are spaced and at least partially vibrationally insulated from any vibration or reactive forces incident to the operation of the motor and mixer 14.

In connection with the present specification, reference is hereby made to the co-pending application, Serial No. 227,124, filed by Frank Rodwick, applicant in the present case, of which application the present case is a division. The above-identified co-pending application contains claims directed to the structure of the bowl, mixer, motor and associated parts, while the present application, in respect to the subject matter claimed, is directed to the handle construction and to the arrangement and combination of the handle structure with the motor housing and other parts of the device.

Changes may be made in the form, construction and arrangement of the several parts without departing from the spirit or scope of the invention, or sacrificing any of its attendant advantages, the form herein described being a preferred embodiment for the purpose of illustrating the invention.

The invention is hereby claimed as follows:

1. A handle construction for an appliance or the like having spaced outer walls extending in substantially parallel lines, said handle being formed of an elongated bail having a transversely extending manually engageable portion and spaced downwardly extending lateral arms projecting along said spaced outer walls and residing firmly against said walls in flatwise relationship, said arms being of substantially different length, each arm having at a point adjacent its extremity an attachment portion engaged with one of said walls, said attachment portions being located in a line inclined at a substantially acute angle with respect to both of said opposed walls, whereby said attachment portions are effective to permit relative angular movement of the handle only about an axis extending at said acute angle with respect to said side walls, said walls being rigid for positively resisting relative angular movement of said handle with respect thereto.

2. A construction as defined in claim 1 wherein said attachment portions comprise inwardly extending pivots adjacent the extremity of each of said lateral arms, said pivots being interengaged in said walls.

3. A construction as defined in claim 1 wherein said walls and said lateral arms extend substantially vertically and wherein said attachment portions are located at substantially vertically spaced points on the respective walls.

4. A construction as defined in claim 1 wherein said appliance comprises a substantially cylindrical member having annular upstanding wall surfaces.

5. A construction as defined in claim 1 wherein said handle means is held firmly against said walls by clamping means embracing at least one of said lateral arms and positively interengaged with said appliance.

6. A construction as defined in claim 1 wherein said handle comprises a plurality of said bails disposed in substantially parallel relationship and wherein the lateral arms are held against said wall by a complementary clamping means embracing said lateral arms and permanently interlocked with said walls.

FRANK RODWICK.